USOO9246367B2

(12) United States Patent
Ohashi et al.

(10) Patent No.: US 9,246,367 B2
(45) Date of Patent: Jan. 26, 2016

(54) AUTOMOTIVE ROTARY ELECTRIC MACHINE

(75) Inventors: Atsushi Ohashi, Tokyo (JP); Kazunori Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 186 days.

(21) Appl. No.: 14/240,649

(22) PCT Filed: Nov. 11, 2011

(86) PCT No.: PCT/JP2011/076073
§ 371 (c)(1),
(2), (4) Date: Feb. 24, 2014

(87) PCT Pub. No.: WO2013/069153
PCT Pub. Date: May 16, 2013

(65) Prior Publication Data
US 2014/0225461 A1 Aug. 14, 2014

(51) Int. Cl.
*H02K 5/10* (2006.01)
*H02K 5/04* (2006.01)
*H02K 11/04* (2006.01)

(52) U.S. Cl.
CPC .. *H02K 5/10* (2013.01); *H02K 5/04* (2013.01); *H02K 11/046* (2013.01)

(58) Field of Classification Search
CPC .................................. H02K 5/04; H02K 5/10
USPC ................................................. 310/89, 68 D
See application file for complete search history.

(56) References Cited

U.S. PATENT DOCUMENTS

| 3,666,978 A | 5/1972 | Renner |
| 2003/0117028 A1* | 6/2003 | Agnes .................... H02K 1/185 310/68 R |
| 2004/0000817 A1 | 1/2004 | Hirsou et al. |

(Continued)

FOREIGN PATENT DOCUMENTS

| FR | 2 950 752 A1 | 4/2011 |
| JP | 7-336974 A | 12/1995 |

(Continued)

OTHER PUBLICATIONS

International Search Report of PCT/JP2011/076073 dated Jan. 24, 2012.

(Continued)

*Primary Examiner* — Naishadh Desai
(74) *Attorney, Agent, or Firm* — Sughrue Mion, PLLC; Richard C. Turner

(57) ABSTRACT

The present invention provides an automotive rotary electric machine that can suppress unnecessary disengagement of a protective cover by increasing supporting strength for the protective cover. The automotive rotary electric machine according to the present invention includes: a rectifier and a voltage regulator that are disposed outside a first axial end of a casing; and a resin protective cover that is formed so as to have a cup shape that is constituted by a bottom portion and a cylindrical peripheral wall portion, and that is mounted onto a casing so as to cover the rectifier and the voltage regulator. The protective cover is held by a circuit board of the rectifier by coupling by snap-fitting a plurality of projections that are disposed so as to protrude from an inner circumferential wall surface of the peripheral wall portion to a plurality of projection-engaging portions that are formed on an outer peripheral wall surface of the circuit board so as to be separated circumferentially.

3 Claims, 4 Drawing Sheets

(56) References Cited

U.S. PATENT DOCUMENTS

| | | |
|---|---|---|
| 2004/0201294 A1 | 10/2004 | Kurahashi |
| 2006/0181167 A1 | 8/2006 | Bradfield et al. |
| 2006/0273671 A1 | 12/2006 | Oohashi |
| 2008/0304986 A1* | 12/2008 | Kenyon ............... H02K 5/128 417/423.12 |
| 2011/0140554 A1* | 6/2011 | Wong .................. H02K 1/17 310/72 |
| 2012/0104887 A1* | 5/2012 | Tanaka ................ H02K 5/08 310/88 |
| 2012/0205993 A1* | 8/2012 | Tanaka ................ H02K 5/225 310/43 |

FOREIGN PATENT DOCUMENTS

| | | |
|---|---|---|
| JP | 2004-080854 A | 3/2004 |
| JP | 2006-340516 A | 12/2006 |
| JP | 2008-263702 A | 10/2008 |
| WO | 2011/039480 A2 | 4/2011 |

OTHER PUBLICATIONS

Communication dated Nov. 12, 2015, issued by the European Patent Office in counterpart European Application No. 11875307.8.

* cited by examiner

AUTOMOTIVE ROTARY ELECTRIC MACHINE

CROSS REFERENCE TO RELATED APPLICATIONS

This is a National Stage of International Application No. PCT/JP2011/076073 filed Nov. 11, 2011, the contents of which are incorporated herein by reference in its entirety.

TECHNICAL FIELD

The present invention relates to an automotive dynamo-electric machine such as an automotive alternator, etc., and particularly relates to a construction for mounting a protective cover that protects a rectifier and a voltage regulator that are supported by a casing.

BACKGROUND ART

In conventional automotive alternators, a rectifier and a voltage regulator are mounted to an outer end surface of a rear bracket, and a cup-shaped protective cover is mounted to the rear bracket from axially outside so as to cover the rectifier and the voltage regulator. The protective cover is supported on the rear bracket by engagement between hook portions of engaging hooks and engaging apertures by inserting engaging hooks that are disposed so as to extend axially from near an opening end of a peripheral wall portion of the cup shape into engaging apertures that have been formed on an outer peripheral edge portion of the rear bracket (see Patent Literature 1, for example).

CITATION LIST

Patent Literature

Patent Literature 1: French Patent Application Publication No. 2950752 (Specification)

SUMMARY OF THE INVENTION

Problem to be Solved by the Invention

In conventional automotive alternators, engaging hooks that are engaged in engaging apertures that are formed on an outer peripheral edge portion of the rear bracket are disposed so as to extend axially from near the opening end of the peripheral wall portion of the cup shape, and are easy to deform elastically. Thus, one problem has been that if any kind of stress acts on the protective cover during transportation of the alternator or during vehicle driving, engagement between the engaging hooks and the engaging apertures is released, disengaging the protective cover. If the protective cover is disengaged during transportation of the alternator, the rectifier and the voltage regulator are exposed, leading to occurrences of damage to the rectifier and the voltage regulator. If the protective cover is disengaged during vehicle driving, the rectifier and the voltage regulator are exposed, leading to occurrences of exposure of the rectifier and the voltage regulator to moisture and adhesion of foreign matter.

The present invention aims to solve the above problems and an object of the present invention is to provide an automotive rotary electric machine that can suppress unnecessary disengagement of a protective cover by increasing supporting strength for the protective cover.

Means for Solving the Problem

In order to achieve the above object, according to one aspect of the present invention, there is provided an automotive rotary electric machine including: a rotor that is disposed inside a casing so as to be fixed to a shaft that is rotatably supported by the casing; a stator including: a stator core; and a stator winding that is mounted onto the stator core, the stator being supported by the casing so as to surround the rotor; a rectifier that rectifies alternating-current electric power that is generated by the stator winding, the rectifier forming a C shape, and being fixed to the casing so as to be disposed outside a first axial end of the casing in a fan shape that is centered around the shaft in a plane that is perpendicular to the shaft; a voltage regulator that adjusts magnitude of an alternating-current voltage that is generated by the stator, the voltage regulator being disposed outside the first axial end of the casing between two circumferential end portions of the C shape of the rectifier; and a resin protective cover that is formed so as to have a cup shape that is constituted by a bottom portion and a tubular peripheral wall portion, and that is mounted to the casing so as to cover the rectifier and the voltage regulator. The rectifier includes a circuit board that includes: a resin-molded body that is formed so as to have a C shape; a plurality of conductors that are insert-molded into the resin-molded body so as to connect rectifying elements so as to configure a diode bridge; and a plurality of projection-engaging portions that are formed on an outer peripheral wall surface of the resin-molded body so as to be separated circumferentially, and the protective cover includes a plurality of projections that are disposed so as to protrude from an inner circumferential wall surface of the peripheral wall portion so as to align with the projection-engaging portions, and is held on the casing by means of the circuit board by coupling the projections to the projection-engaging portions by snap-fitting using elasticity of the peripheral wall portion.

Effects of the Invention

According to the present invention, because projections are disposed so as to project from an inner circumferential wall surface of a peripheral wall portion near a bottom portion, coupling strength of the snap-fitting between the projections and projection-engaging portions is increased. Supporting strength for the protective cover is thereby increased, enabling unnecessary disengagement of the protective cover to be suppressed.

DESCRIPTION OF EMBODIMENTS

A preferred embodiment of an automotive rotary electric machine according to the present invention will now be explained with reference to the drawings.

Figure 1:
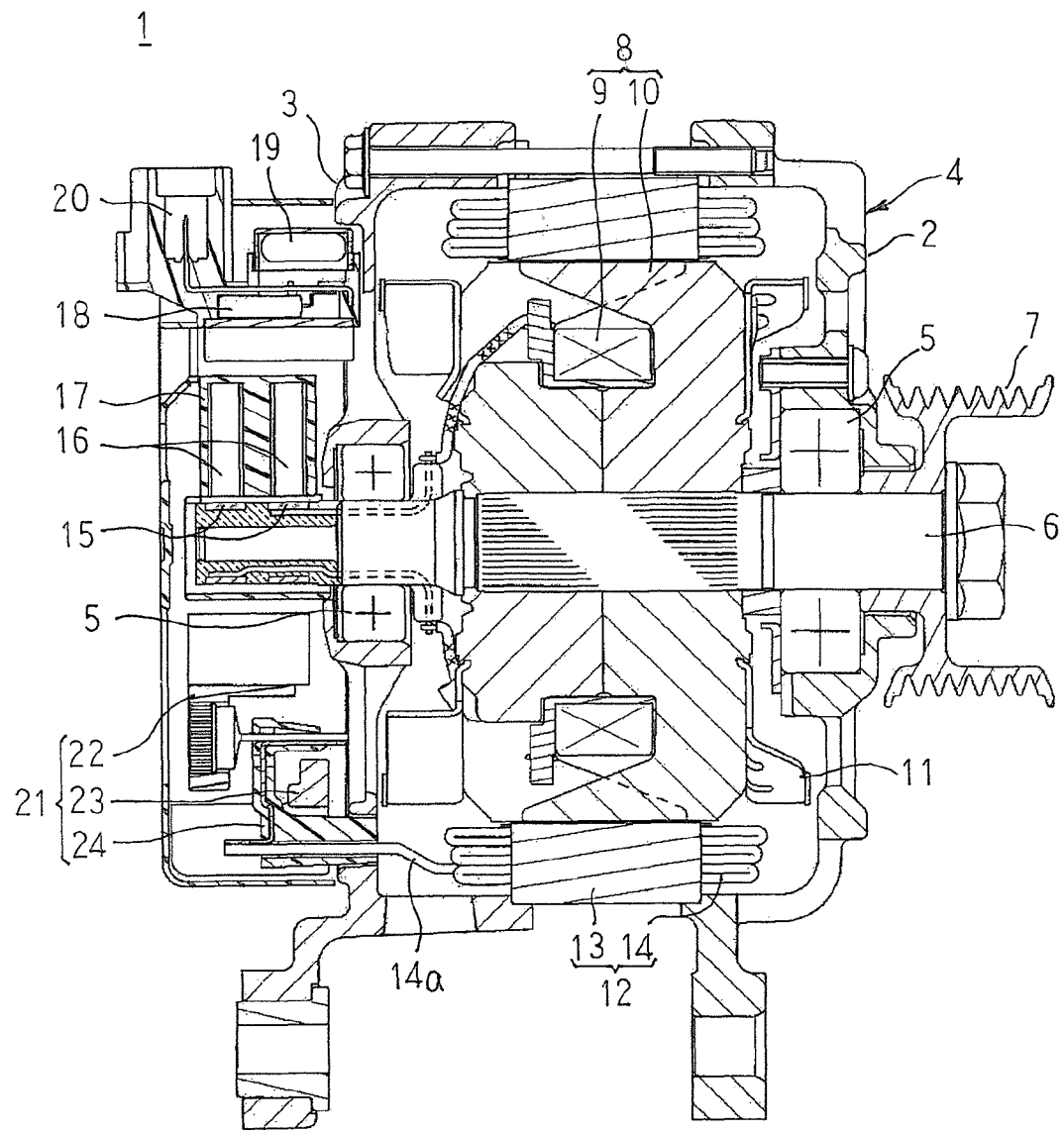
FIG. 1 is a cross section that shows an automotive alternator according to a preferred embodiment of the present invention.
Figure 2:
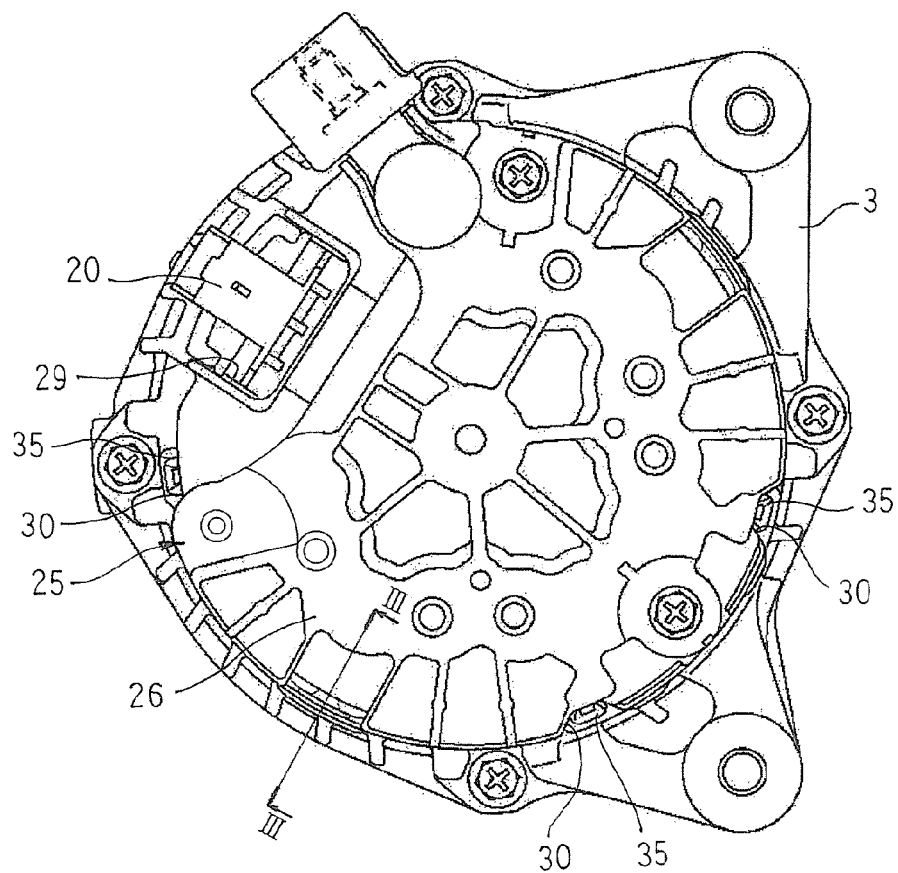
FIG. 2 is a rear-end end elevation that shows the automotive alternator according to the preferred embodiment of the present invention.
Figure 3:
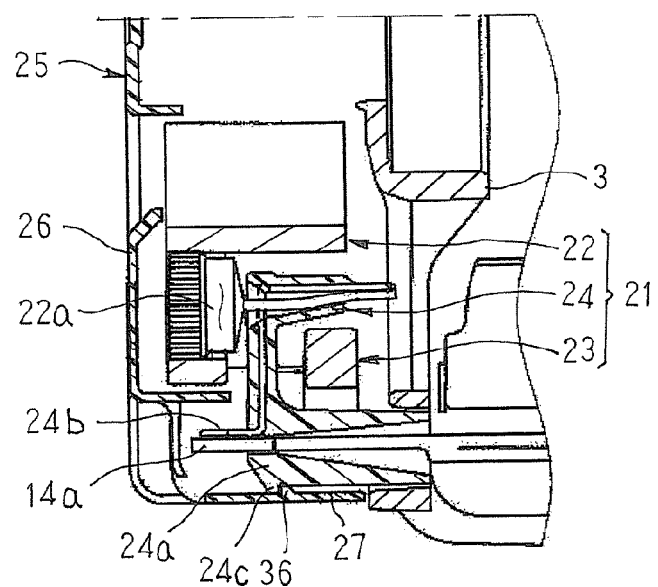
FIG. 3 is a cross section that is taken along Line III-III in FIG. 2 so as to be viewed in the direction of the arrows.
Figure 4:
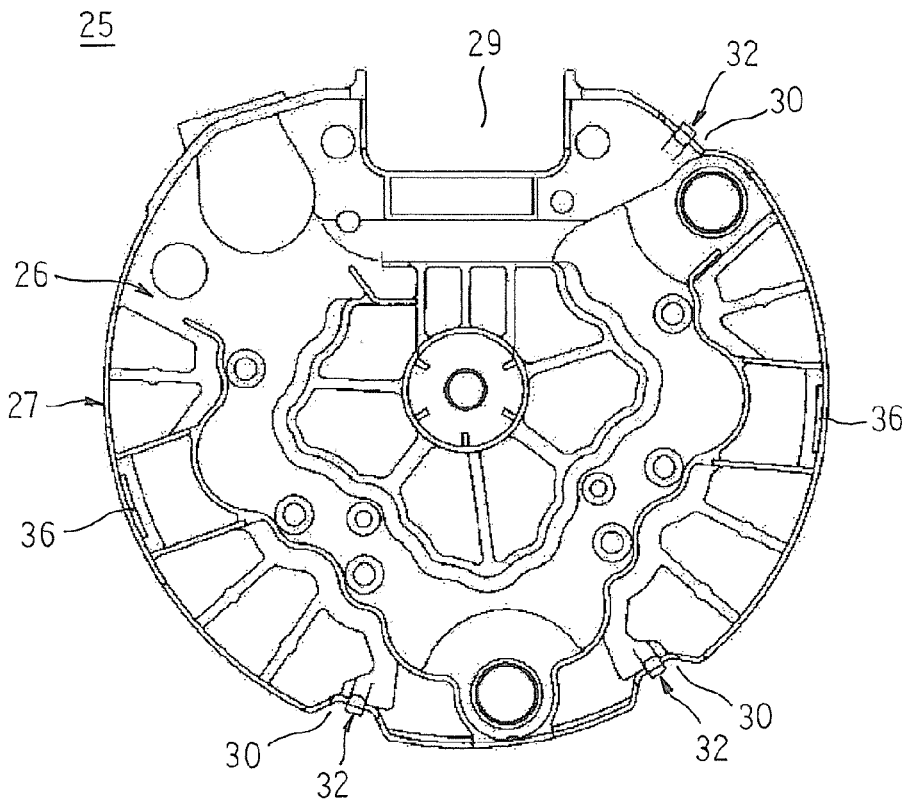
FIG. 4 is a plan that shows a protective cover in the automotive alternator according to the preferred embodiment of the present invention that is viewed from an opening end.
Figure 5:
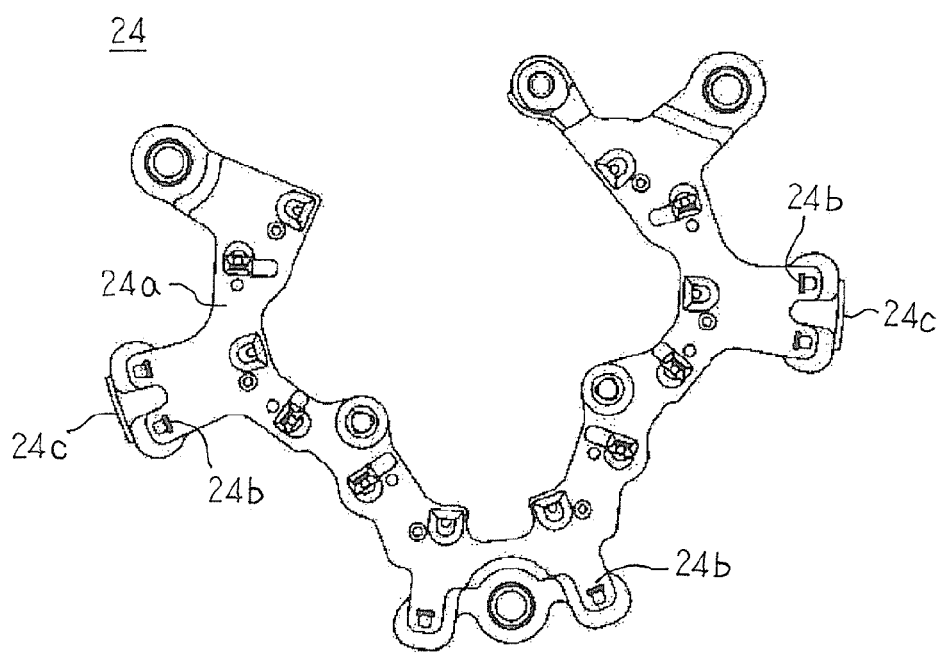
FIG. 5 is a plan that shows a circuit board in the automotive alternator according to the preferred embodiment of the present invention.
Figure 6:
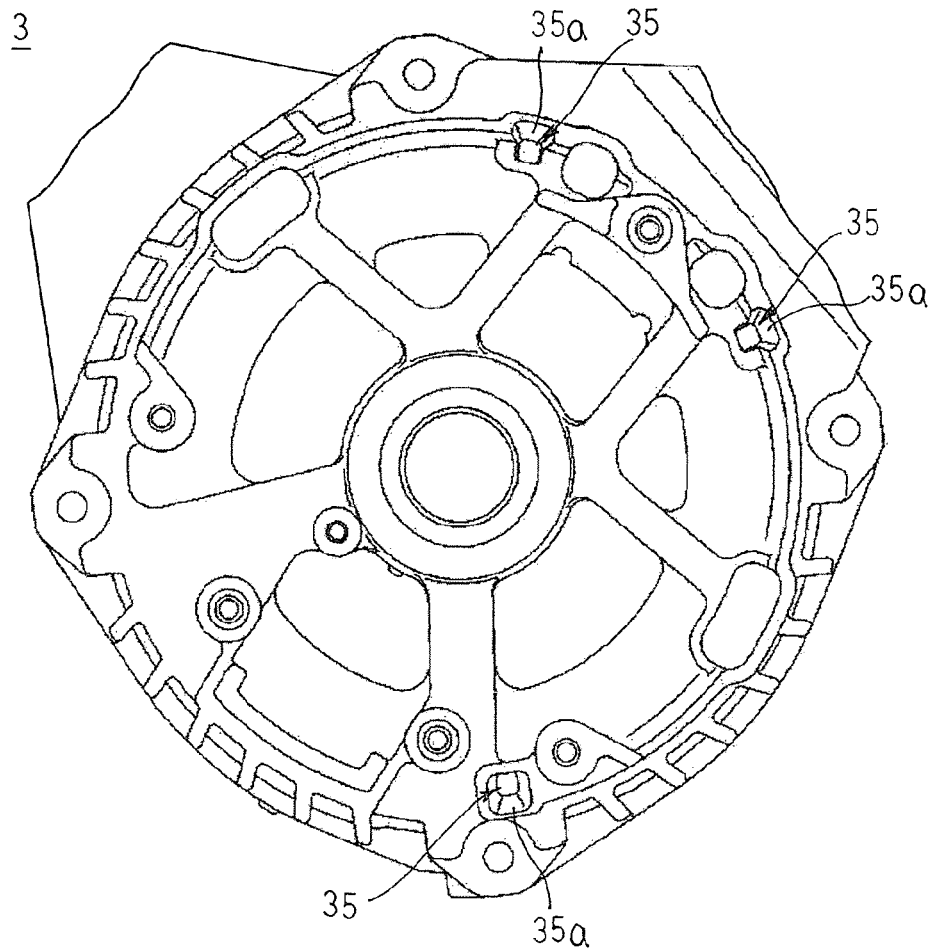
FIG. 6 is a rear-end end elevation that shows a rear bracket in the automotive alternator according to the preferred embodiment of the present invention.
Figure 7:
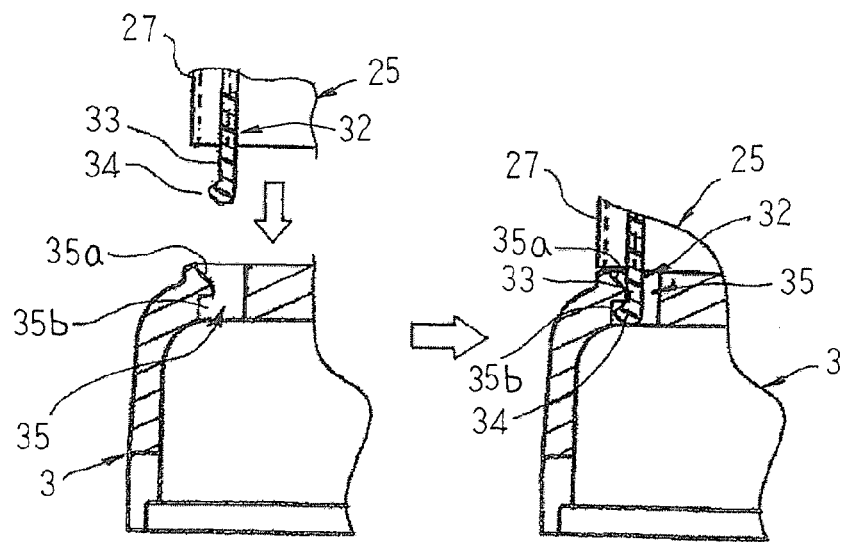
FIG. 7 is a partial cross section that explains a mounted state of the protective cover in the automotive alternator according to the preferred embodiment of the present invention.

FIG. 1 is a cross section that shows an automotive alternator according to a preferred embodiment of the present invention, FIG. 2 is a rear-end end elevation that shows the automotive alternator according to the preferred embodiment of the present invention, FIG. 3 is a cross section that is taken along Line III-III in FIG. 2 so as to be viewed in the direction of the arrows, FIG. 4 is a plan that shows a protective cover in the automotive alternator according to the preferred embodiment of the present invention that is viewed from an opening end, FIG. 5 is a plan that shows a circuit board in the automotive alternator according to the preferred embodiment of the present invention, FIG. 6 is a rear-end end elevation that shows a rear bracket in the automotive alternator according to the preferred embodiment of the present invention, and FIG. 7 is a partial cross section that explains a mounted state of the protective cover in the automotive alternator according to the preferred embodiment of the present invention.

In FIGS. 1 and 2, an automotive alternator 1 includes: a casing 4 that is constituted by a front bracket 2 and a rear bracket 3 that are each approximately cup-shaped and made of aluminum; a shaft 6 that is rotatably supported in the casing 4 by means of a pair of bearings 5; a pulley 7 that is fixed to an end portion of the shaft 6 that projects out frontward from the casing 4; a rotor 8 that is fixed to the shaft 6 and that is disposed inside the casing 4; fans 11 that are fixed to two axial end surfaces of the rotor 8; a stator 12 that is fixed to the casing 4 so as to surround the rotor 8; a pair of slip rings 15 that are fixed to a portion of the shaft 6 that projects out rearward from the casing 4 and that supply electric current to the rotor 8; a pair of brushes 16 that slide on respective surfaces of the slip rings 15; a brush holder 17 that accommodates the brushes 16; a voltage regulator 18 that adjusts magnitudes of alternating-current voltages that are generated in the stator 12; a noise-preventing capacitor 19 that is mounted onto the voltage regulator 18; a connector 24 that is formed integrally on the voltage regulator 18, and that performs input and output of signals between the voltage regulator 18 and external devices (not shown); a rectifier 21 that is disposed at the rear end of the rear bracket 3, and that rectifies the alternating-current voltages that are generated in the stator 12 into a direct-current voltage; and a protective cover 50 that is mounted onto the rear bracket 3 so as to cover the brush holder 17, the voltage regulator 18, and the rectifier 21, as described below.

The rotor 8 is a Lundell rotor, and includes: a field winding 9 that generates magnetic flux on passage of an excitation current; and a field core 10 that is disposed so as to cover the field winding 9, and in which magnetic poles are formed by the magnetic flux. The stator 12 includes: a cylindrical stator core 13; and a stator winding 14 that is mounted onto the stator core 13, and in which alternating currents are generated by changes in the magnetic flux from the field winding 9 that accompany rotation of the rotor 8. The stator 12 is disposed such that the stator core 13 is held between opening ends of the front bracket 2 and the rear bracket 3 from two axial ends so as to surround the rotor 8.

The rectifier 21 includes: a positive-side heatsink 22 to which a plurality of positive-side rectifying elements 22a are mounted; a negative-side heatsink 23 to which a plurality of negative-side rectifying elements (not shown) are mounted; and a circuit board 24, and is configured into an approximate C shape in which the circuit board 24 is inserted between the positive-side heatsink 22 and the negative-side heatsink 23.

As shown in FIG. 5, the circuit board 24 includes: a resin-molded body 24a that is formed so as to have an approximate C shape; a plurality of conductors 24b that are insert-molded into the resin-molded body 24a so as to connect the rectifier 21 and the stator windings 14 electrically; and two projections 24c that are disposed so as to project from a first axial end of an outer peripheral wall surface of the resin-molded body 24a so as to be separated in a circumferential direction, and that function as projection-engaging portions. The plurality of conductors 24b are formed such that the positive-side rectifying elements 22a and the negative-side rectifying elements constitute a predetermined bridge circuit.

A rectifier 21 that has been configured in this manner is fastened to an outer end surface of the rear bracket 3 outside the slip rings 15 so as to be disposed in a fan shape that is centered around the shaft 6 in a plane that is perpendicular to a central axis of the shaft 6. The circuit board 24 is disposed such that the projections 24c are positioned on an opposite side from the rear bracket 3. Output wires 14a of the stator winding 14 are led out through the rear bracket 3 and are connected to the conductors 24b of the circuit board 24 to connect the rectifier 21 and the stator winding 14 electrically. The brush holder 17 is disposed between two circumferential end portions of the approximate C shape of the rectifier 21, and is fastened to the outer end surface of the rear bracket 3. In addition, the voltage regulator 18, onto which the capacitor 19 and the connector 20 are mounted integrally, is disposed radially outside the brush holder 17 between two circumferential end portions of the approximate C shape of the rectifier 21, and is fastened to the outer end surface of the rear bracket 3.

Next, the protective cover 25 will be explained with reference to FIGS. 2 through 4.

The protective cover 25 is formed into a cup shape that is constituted by a bottom portion 26 and a cylindrical peripheral wall portion 27 using an electrically insulating resin such as polybutylene terephthalate (PBT), nylon 66, etc.

A connector outlet aperture 29 is formed by cutting away a portion of the bottom portion 26 and the peripheral wall portion 27 of the protective cover 25. In addition, three recess portions 30 are each formed by hollowing a portion of the peripheral wall portion 27 radially inward so as to extend continuously from an opening end of the peripheral wall portion 27 to the bottom portion 26. In addition, the two projections 36 are each disposed so as to project from the inner circumferential wall surface of the peripheral wall portion 27 near the bottom portion 26 so as to be separated in a circumferential direction.

The three recess portions 30 are formed so as to be distributed circumferentially, and the two projections 36 are formed at approximately symmetrical positions relative to a central axis (center) of the peripheral wall portion 27. Thus, the recess portions 30 and the projections 36 are formed so as to make circumferential positions of formation thereof different so as to be distributed circumferentially. Here, one projection 36 is disposed between adjacent recess portions 30 that are disposed on one side in the circumferential direction of the connector outlet aperture 29, and the other projection 36 is disposed between the connector outlet aperture 29 and the recess portion 30 that is disposed on the other side in the circumferential direction of the connector outlet aperture 29.

Engaging hooks 32 are constituted by: shank portions 33 that are disposed so as to extend in groove directions of the recess portions 30 from opening ends of the peripheral wall portion 27 at circumferentially central positions of each of the recess portions 30; and hook portions 34 that are disposed so as to project radially outward from the peripheral wall portion 27 from tip ends of the shank portions 33. Here, portions of root portions of the hook portions 34 that face radially outward are formed so as to have inclined surfaces that displace radially outward sharply toward tip ends. Portions of tip end portions of the hook portions 34 that face radially outward are formed so as to have inclined surfaces that gradually displace radially inward toward the tip ends.

Portions of the projections 36 that face radially inward near the bottom portion 26 are formed so as to have inclined surfaces that displace radially inward rapidly toward the opening, and portions of the projections 36 that face radially inward near the opening are formed so as to have inclined surfaces that displace radially outward gradually toward the opening.

Moreover, as shown in FIGS. 3 and 5, the two projections 24c are disposed so as to project near a first axial end of the outer peripheral wall surface of the resin-molded body 24a so as to align with the respective projections 36. Portions of each of the projections 24c that face radially outward near the first axial end are formed so as to have inclined surfaces that displace radially outward gradually toward a second axial end, and portions of each of the projections 24c that face radially outward near the second axial end are formed into stepped portions that displace radially inward in a stepped shape toward the second axial end.

As shown in FIGS. 6 and 7, engaging apertures 35 that function as hook-engaging portions are formed on an outer circumferential edge portion of the rear bracket 3 so as to align with each of the engaging hooks 32. Portions of the inner wall surfaces of each of the engaging apertures 35 that face radially inside the rear bracket 3 are formed so as to have aperture shapes that have: inclined surface portions 35a that gradually displace radially inward toward the opening of the rear bracket 3 from an outer end surface of the rear bracket 3; and stepped portions 35b that displace radially outward in a stepped shape toward the opening of the rear bracket 3 from the inclined surface portions 35a.

Next, a procedure for mounting the protective cover 25 that is configured in this manner onto the rear bracket 3 will be explained.

First, the opening side of the protective cover 25 is oriented toward the rear bracket 3 and the engaging hooks 32 are matched up with the engaging apertures 35. Positioning among the projections 36 and the projections 24c is thereby performed simultaneously. Next, as shown in FIG. 7, the protective cover 25 is moved toward the rear bracket 3, and the engaging hooks 32 are inserted into the engaging apertures 35. The hook portions 34 of the engaging hooks 32 contact the inclined surface portions 35a of the engaging apertures 35, slide on the inclined surface portions 35a of the engaging apertures 35 while elastically deforming the shank portions 33 radially inward, and are inserted into the engaging apertures 35. Then, when the hook portions 34 pass the inclined surface portions 35a, the shank portions 33 return to their original state, and the hook portions 34 project into the stepped portions 35b. The engaging hooks 32 and the engaging apertures 35 are thereby coupled by snap-fitting by the elasticity of the shaft portions 33 (the engaging hooks 32).

The projections 36 contact the inclined surfaces of the projections 24c simultaneously and elastically deform the peripheral wall portion 27 radially outward while sliding over the inclined surfaces of the projections 24c. When the projections 36 pass the inclined surfaces of the projections 24c, the peripheral wall portion 27 recovers, and projects outward into the stepped portions of the projections 24c. The projections 24c and 36 are thereby coupled by snap-fitting by the elasticity of the peripheral wall portion 27.

Thus, the protective cover 25 is held on the rear bracket 3 by snap-fit coupling between the engaging hooks 32 and the engaging apertures 35 that uses the elasticity of the engaging hooks 32, and by snap-fit coupling of the projections 24c and 36 that uses the elasticity of the peripheral wall portion 27.

Here, the inclined surfaces of the root portions of the hook portions 34 are pushed against corner portions near the inclined surface portions 35a of the stepped portions 35b by the restoring forces of the shank portions 33, generating forces that pull the protective cover 25 toward the rear bracket 3. Similarly, the inclined surfaces of the projections 36 near the bottom portion 26 are pushed against corner portions of the stepped portions 35b of the projections 24c by the restoring forces of peripheral wall portion 27, generating forces that pull the protective cover 25 toward the rear bracket 3. The opening end of the protective cover 25 is thereby pushed against the outer circumferential edge portion of the rear bracket 3. Thus, the protective cover 25 is held elastically on the rear bracket 3 in an engaged state, suppressing wobbling of the protective cover 25.

Thus, in this embodiment, a protective cover 25 is held on a rectifier 21 that is fastened to a rear bracket 3 by coupling projections 36 that are disposed so as to project from an inner circumferential wall surface of a peripheral wall portion 27 of the protective cover 25 near a bottom portion 26 by snap-fitting onto projections 24c that are disposed so as to project from an outer peripheral wall surface of a resin-molded body 24a near a first axial end. Because these projections 36 are disposed so as to project from the inner circumferential wall surface of the peripheral wall portion 27 of the protective cover 25 near the bottom portion 26, which is difficult to deform elastically, the snap-fit coupling by the projections 24c and 36 is less likely to be released, making the protective cover 25 less likely to disengage. Thus, even if stresses that could otherwise dislodge the protective cover 25 act on the protective cover 25 during transportation of the automotive alternator 1 or during driving of a vehicle that is equipped with the automotive alternator 1, situations such as the protective cover 25 being disengaged are prevented, suppressing the occurrence of damage to the rectifier 21 and the voltage regulator 18 and the occurrence of exposure of the rectifier 21 and the voltage regulator 18 to moisture and adhesion of foreign matter.

Because the snap-fit coupling by the projections 24c and 36 is performed at two positions on the peripheral wall portion 27 of the protective cover 25 that are approximately symmetrical relative to center, disengagement of the protective cover 25 is prevented even if the stresses that could otherwise dislodge the protective cover 25 act on the protective cover 25 at an angle.

Because the protective cover 25 is held on the rear bracket 3 by coupling engaging hooks 32 that extend outward from the opening end of the peripheral wall portion 27 of the protective cover 25 by snap-fitting into engaging apertures 35 that are formed on an outer circumferential edge portion of the rear bracket 3 in addition to the snap-fit coupling by the projections 24c and 36, the holding force of the protective cover 25 by the rear bracket 3 is increased, making the protective cover 25 even less likely to disengage.

Because the two positions of snap-fit coupling by the projections 24c and 36 and the three positions of snap-fit coupling by the engaging hooks 32 and the engaging apertures 35 are distributed circumferentially, disengagement of the protective cover 25 is reliably prevented even if the stresses that could otherwise dislodge the protective cover 25 act on the protective cover 25 at an angle.

Moreover, in the above embodiment, an explanation is given for an automotive alternator, but the present invention is not limited to automotive alternators, and similar effects are also exhibited if the present invention is applied to automotive rotary electric machines such as automotive electric motors, automotive generator-motors, etc.

In the above embodiment, the peripheral wall portion of the protective cover is formed so as to have a cylindrical shape, but the shape of the peripheral wall portion of the protective cover is not limited to a cylindrical shape, provided that it is a tubular shape that surrounds an outer circumferential side of the rectifier and the voltage regulator that are mounted onto the outer end surface of the rear bracket.

In the above embodiment, two snap-fitting coupling portions using projections are disposed so as to be separated in a circumferential direction, but the number of two snap-fitting coupling portions using projections is not limited to two, and may also be three or more. In that case, it is desirable to form the snap-fitting coupling portions using projections and the snap-fitting coupling portions using engaging hooks and engaging apertures such that the circumferential positions of formation thereof are different so as to be distributed approximately uniformly in the circumferential direction.

In the above embodiment, projection-engaging portions are projections that are formed on the outer peripheral wall surface of the resin-molded body of the circuit board, but the shape of the projection-engaging portion is not limited to projections, provided that the projections that are disposed so as to protrude from the inner circumferential wall surface of the peripheral wall portion of the protective cover are coupled by snap-fitting, and they may also be recess portions that are formed on the outer peripheral wall surface of the resin-molded body of the circuit board, for example.

In the above embodiment, projections are disposed so as to project from the inner circumferential wall surface of the peripheral wall portion near the bottom portion, but the positions of formation of the projections are not limited to the inner circumferential wall surface of the peripheral wall portion near the bottom portion. The closer the positions of formation of the projections are to the bottom portion on the peripheral wall portion the harder it becomes to deform the peripheral wall portion elastically at the positions of formation of the projections, increasing the snap-fit coupling strength and making the protective cover less likely to disengage. Thus, the positions of formation of the projections on the peripheral wall portion need only be set appropriately so as to obtain the required snap-fit coupling strength.

The invention claimed is:

1. An automotive rotary electric machine comprising:
   a rotor that is disposed inside a casing so as to be fixed to a shaft that is rotatably supported by said casing;
   a stator comprising:
   a stator core; and
   a stator winding that is mounted onto said stator core, said stator being supported by said casing so as to surround said rotor;
   a rectifier that rectifies alternating-current electric power that is generated by said stator winding, said rectifier forming a C shape, and being fixed to said casing so as to be disposed outside a first axial end of said casing in a fan shape that is centered around said shaft in a plane that is perpendicular to said shaft;
   a voltage regulator that adjusts magnitude of an alternating-current voltage that is generated by said stator, said voltage regulator being disposed outside said first axial end of said casing between two circumferential end portions of said C shape of said rectifier; and
   a resin protective cover that is formed so as to have a cup shape that is constituted by a bottom portion and a tubular peripheral wall portion, and that is mounted to said casing so as to cover said rectifier and said voltage regulator,
   wherein:
   said rectifier comprises a circuit board that comprises:
   a resin-molded body that is formed so as to have a C shape;
   a plurality of conductors that are insert-molded into said resin-molded body so as to connect rectifying elements so as to configure a diode bridge; and
   a plurality of projection-engaging portions that are formed on an outer peripheral wall surface of said resin-molded body so as to be separated circumferentially; and
   said protective cover comprises a plurality of projections that are disposed so as to protrude from an inner circumferential wall surface of said peripheral wall portion so as to align with said projection-engaging portions, and is held on said casing by means of said circuit board by coupling said projections to said projection-engaging portions by snap-fitting using elasticity of said peripheral wall portion.

2. An automotive rotary electric machine according to claim 1, wherein:
   hook-engaging portions are formed on said casing;
   said protective cover comprises engaging hooks that are formed so as to align with said hook-engaging portions, and that comprise:
   a shank portion that is disposed so as to extend from an opening end of said peripheral wall portion; and
   a hook portion that is disposed so as to project radially outward from a tip end of said shank portion, and
   said protective cover is held on said casing by coupling said hook-engaging portions to said engaging hooks by snap-fitting using elasticity of said engaging hooks.

3. An automotive rotary electric machine according to claim 2, wherein said projections and said engaging hooks are disposed such that circumferential positions of formation are made different from each other so as to be distributed circumferentially.

* * * * *